United States Patent

[11] 3,580,419

[72] Inventor Clarence F. Carter
 Danville, Ill.
[21] Appl. No. 718,123
[22] Filed Apr. 2, 1968
[45] Patented May 25, 1971
[73] Assignee Carter Engineering Company
 Danville, Del.

[54] METHOD AND APPARATUS FOR FEEDING AND COMPACTING FINELY DIVIDED PARTICULATE MATERIAL
 7 Claims, 5 Drawing Figs.
[52] U.S. Cl. .................................................. 222/1,
 222/189, 222/413
[51] Int. Cl. ..................................................... B67d 5/88
[50] Field of Search ........................................... 222/189,
 193, 413, 1, 152.53; 141/7, 8, 59, 67, 286; 55/302,
 452

[56] References Cited
 UNITED STATES PATENTS

| | | | |
|---|---|---|---|
| 2,170,469 | 8/1939 | Carter | 141/7 |
| 2,142,990 | 1/1939 | Belcher | 151/286X |
| 2,985,201 | 5/1961 | Baker | 141/59X |
| 3,269,611 | 7/1966 | Komarek | 222/413X |
| 3,333,679 | 8/1967 | Zimmerman et al. | 222/413X |

Primary Examiner—Robert B. Reeves
Assistant Examiner—H. S. Lane
Attorney—Burns, Doane, Swecker and Mathis ABSTRACT: A method of feeding and compacting finely divided particulate material, which utilizes a rotating screw feeder for advancing the material along a sleeve passage provided by a stationary foraminous sleeve mounted closely about the screw feeder. The method includes the steps of advancing the particulate material axially along the sleeve with the interstitial air between the particles in the sleeve at an internal sleeve pressure. Suction pressure relatively lower than the internal sleeve pressure is applied to the exterior of the sleeve to withdraw air from between the particles of the material to effect compaction of the material. At predetermined times gas pressure relatively higher than the internal sleeve pressure is applied to the exterior of the sleeve to backflush material from openings in the sleeve to prevent clogging thereof.

An apparatus for feeding and compacting finely divided particulate material, which includes a housing having fixedly mounted therein a tubular sleeve. The sleeve and housing define at least one closed hollow chamber extending about the sleeve with a plurality of perforations in the sleeve placing the interior thereof in fluid communication with the interior of the chamber. An axially extending screw feeder concentrically and rotatably mounted in the sleeve is adapted to advance material axially along the sleeve, with the interstitial air present between the particles of material in the sleeve at an internal sleeve pressure. Suction means in fluid communication with the chamber applies suction pressure relatively lower than the internal sleeve pressure to withdraw air from between the particles of material to affect compaction thereof. Gas pressure means in fluid communication with the chamber provides gas at a relatively higher pressure than the internal sleeve pressure at predetermined times to backflush particulate material from the perforations, to prevent clogging thereof.

PATENTED MAY 25 1971 3,580,419

INVENTOR
CLARENCE F. CARTER

BY Burns, Doane, Benedict, Swecker & Mathis
ATTORNEYS 3,580,419

METHOD AND APPARATUS FOR FEEDING AND COMPACTING FINELY DIVIDED PARTICULATE MATERIAL

BACKGROUND OF THE INVENTION

This invention relates to a method and apparatus for feeding and compacting finely divided particulate material, such as for example fluffy powders and the like.

In handling finely divided particulate material such as for fluffy powders, it is sometimes necessary to reduce the bulk of the powder while it is being fed from one location to another. This may be particularly necessary in packaging operations, for a number of reasons. For example, once packaged in containers, such powders have a tendency to settle out during storage and transit with the result that the containers may appear partially empty and underpacked on opening. Additionally, it may be necessary to provide for compaction in order to reduce required container dimensions to an acceptable size.

Accordingly, various systems have heretofore been proposed for simultaneously feeding and compacting materials of this type. One prior system for example utilizes a screw feeder having a helical flight of decreasing pitch so that as the material is advanced into the more closely spaced region of the flight, it is mechanically compressed. Unfortunately, such mechanical compression of fluffy powders may often be undesirable due to the tendency of such particles in the powder to bind together under the influence of the mechanical compression. This may result in providing a product of uneven consistency, and additionally may lead to bridging of the material.

Another approach, intended to obviate the disadvantages of mechanical compression, has been to permit the particulate material to fall downwardly through the interior of a foraminous sleeve while applying vacuum to the exterior of the sleeve to cause air to be removed from the particulate material, thus compacting it. Systems of this type, however, suffer from the disadvantage that the foraminous sleeve may rapidly become clogged with particles of the material. Such clogging has at least two significant disadvantages. Firstly, it may reduce the ability of the perforations, en masse, to transmit suction to the interior of the sleeve, thus reducing the rate at which air is removed from the powder. Secondly, the distribution of the clogging may often be unevenly distributed about the sleeve with the result that suction is unevenly applied to the material during feeding. This may lead to undesirable variations in the consistency of the final compacted material.

Another problem associated with such foraminous sleeve type devices is that the vacuum applied may tend to hold some of the particulate material in static relation against the interior of the sleeve, thus reducing the overall rate at which material may be be fed.

SUMMARY OF INVENTION

It is therefore a general object of the invention to provide a method and apparatus for feeding and compacting finely divided particulate materials, which obviates or minimizes problems of the type previously noted.

It is a particular object of the invention to provide a method and apparatus for feeding and compacting finely divided particulate material in which the material continues to be compacted uniformly during protracted operation, to provide a product of particularly even consistency.

It is a further object of the invention to provide an apparatus for feeding and compacting finely divided particulate material utilizing a foraminous sleeve in which problems of clogging of the sleeve with particles of the material are effectively reduced.

A method of feeding and compacting finely divided particulate material, intended to accomplish at least some of the foregoing objects utilizes a rotating screw feeder for advancing the material through a stationary foraminous sleeve mounted closely about the screw feeder. The method includes the steps of advancing the particulate material axially through the sleeve with the interstitial air between particles in the material in the sleeve being at an internal sleeve pressure. A suction pressure relatively lower than the internal sleeve pressure is applied to the exterior of the sleeve to withdraw air from between the particles of the material to effect compaction of the material. Gas at a gas pressure relatively higher than the internal sleeve pressure is applied to the exterior of the sleeve at predetermined times to back-flush particulate material from the perforations in the sleeve to prevent clogging thereof.

In a further method aspect of the invention the step of applying gas pressure includes the further steps of providing noncommunicating, closed hollow chambers about different peripherally spaced areas of the sleeve. The gas pressure is then applied to each of the chambers in turn at predetermined times during which the other of the chambers has suction pressure applied thereto. In this manner the pressure differential across the perforations in the sleeve is increased to assist the back-flushing action.

An apparatus for feeding and compacting finely divided particulate material, according to a preferred embodiment of the invention includes a housing having fixedly mounted therein a tubular sleeve. The sleeve and adjacent interior portions of the housing define at least one closed hollow chamber extending about the sleeve. The sleeve further includes a plurality of perforations placing the chamber in communication with the interior of the sleeve. An axially extending screw feeder concentrically and rotatably mounted in the sleeve feeds particulate material axially along the sleeve with the interstitial air present between the particles in the material in the sleeve, being at an internal sleeve pressure. Suction means connected with the housing is placed in fluid communication with the chamber to apply a suction pressure relatively lower than the internal sleeve pressure to withdraw air from the particulate material, thus effecting compaction of it. Gas pressure means connected with the housing, is placed in fluid communication with the chamber at predetermined times for supplying gas at a gas pressure relatively higher than the internal sleeve pressure to the perforations. In this manner, the particulate material is periodically back-flushed from the perforations in the sleeve to prevent clogging.

In a further aspect of the invention, partition means are provided extending between the sleeve and the housing, to divide the chamber into at least two axially extending, noncommunicating subchambers extending peripherally about different portions of the sleeve. The suction means further includes first and second suction means each communicating different ones of the subchambers. Similarly, the gas pressure means includes first and second gas pressure means each communicating different ones of the subchambers. In operation each of the gas pressure means is connected in turn to its associated pressure subchamber at a time during which the other of the subchambers is concurrently connected to its associated suction means. In this manner an increased pressure differential to assist in back-flushing gas through the perforations in the sleeve is created.

THE DRAWINGS

An apparatus for feeding and compacting finely divided particulate materials according to a preferred embodiment of the invention, is illustrated in the accompanying drawings in which, FIG. 1 is a side view of an apparatus according to a preferred embodiment of the invention;

DETAILED DESCRIPTION

Figure 1:
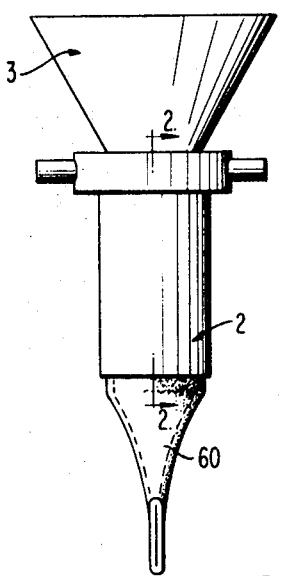

Referring to FIG. 1 of the drawings, an apparatus for feeding and compacting finely divided particulate material according to a preferred embodiment of the invention is there shown.

Figure 2:
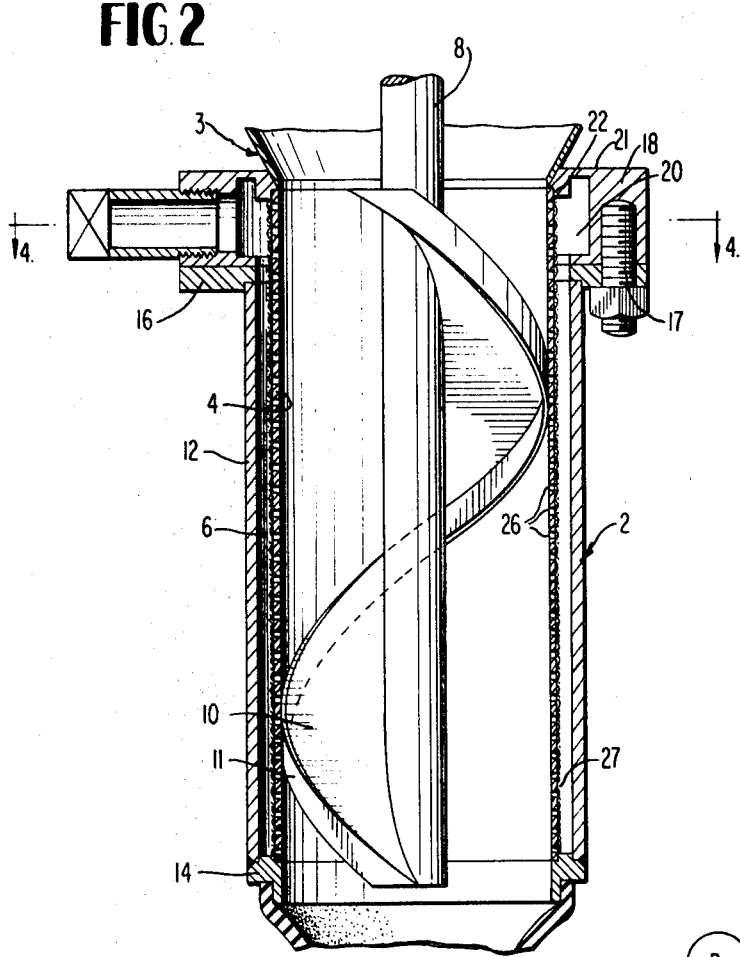
FIG. 2 is a cross-sectional, end view of a portion of the apparatus shown in FIG. 1 TAKEN ALONG THE LINES 2-2 therein.

The apparatus includes a housing, generally designated 2 connected to the lower end of a conventional hopper 3 containing a mass of the particulate material. Positioned within the housing 2 is an axially extending foraminous, circular sleeve 4 (FIG. 2), having an axially extending internal sleeve passage communicating at its upper end with the interior of the hopper 3. The tube 2 and the housing 4 define an enclosed hollow chamber 6 extending about the sleeve. Extending through the sleeve 4 is a concentric circular shaft 8 supported in fixed relation to the sleeve for rotation relative thereto, by suitable conventional bearing structure (not shown) connected with the housing. A screw flight 10, fixedly secured to the shaft 8, extends between the shaft and the interior of the sleeve and advances the particulate material downwardly axially through the sleeve passage from the hopper 3 during rotation of the shaft 8.

Suction at a pressure lower than that within the sleeve is applied to the chamber 6 (as will be described) to withdraw the interstitial air from between the particles of material as it is being fed through the tube, to cause the material to become compacted. To prevent the vacuum from causing some of the particulate material to adhere in static condition to the interior of the sleeve, the conveyor flight 10 is provided with a downwardly projecting thin sheet metal lip 11 secured to the peripheral edge of the flight, which shears any adhered powder from the interior of the sleeve. At predetermined times, air is supplied to the chamber 6 at a pressure higher than that in the interior of the sleeve to cause air to pass in a reverse direction through the sleeve perforations to back-flush particulate material therefrom to prevent clogging.

Figure 3:
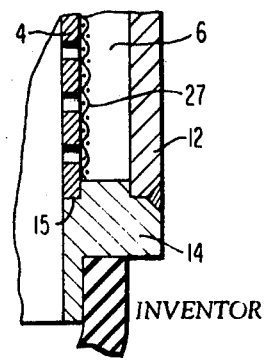
FIG. 3 is a cross-sectional view of a portion of the apparatus shown in FIG. 2, but on an enlarged scale.

In more detail, the housing 2 includes an axially extending, vertically disposed, tubular metal body 12 of circular cross section. An inwardly extending, horizontally disposed annular bottom plate 14 is fixedly secured to the lower end of the tube 12 by welding, although other conventional methods may be used. The bottom plate 14 includes an upwardly facing, peripherally extending rectangular notch 15 (FIG. 3) which receives and supports the lower end of the sleeve 4 and locates it in spaced concentric relation to the interior of the tubular body 12. At its upper end, the tubular body 12 is fixedly secured to a radially outwardly extending, annular top plate 16 (FIG. 2) spaced radially from the sleeve 4 and having a flat horizontal upper surface.

An annular top member 18 is fixedly secured to the flat upper surface of the top plate 16 by suitable elongate threaded connectors 17. The top member 18 extends axially upwardly and is provided with a peripherally extending, internal chamber 20 facing toward the sleeve 4 and communicating with the previously mentioned annular space 6 between the tubular body 12 and the sleeve. The top member 18 also includes a peripherally extending flange 21 projecting radially inwardly adjacent the upper end of the top member and provided with a downwardly facing peripherally extending, rectangular notch 22 for receiving and supporting the top end of the sleeve 4 and locating it concentrically of the housing.

In order to prevent leakage of air a seal between the sleeve 4 and the housing 2 at the top and bottom ends of the sleeve is provided by the use of suitable sealing materials between the notches 22 and 15 and the sleeve.

The previously mentioned conveyor flight 10 is formed of sheet metal extending in helicoidal fashion about the shaft 8 and is rotated by conventional means (not shown) in such a direction as to advance material downwardly through the sleeve. At its upper end the sleeve 4 and the conveyor communicate with the hopper 3 containing a supply of the particulate material. The material in the supply contains a certain amount of interstitial air, between the particles in the material. Usually this interstitial air will be at substantially atmospheric pressure although use of a supply functioning at pressures above or below atmospheric pressure is possible. As the material is fed through the sleeve the interstitial air is at an internal sleeve pressure substantially equal to that prevailing in the supply, i.e., usually atmospheric pressure.

During passage of the material by the screw conveyor through the sleeve, the previously mentioned suction pressure is applied to the exterior of the sleeve. This suction pressure is less than the internal sleeve pressure to cause a large portion of the interstitial air to be sucked out of the conveyed material, thus compacting it. For example, utilizing a supply under atmospheric pressure, the suction pressure may typically be of the order of 25 inches of mercury vacuum.

As suction is applied to the sleeve 4, however, some of the particulate material may tend to become held statically by the vacuum to the interior surface of the sleeve 4, thus resisting motion axially down through the sleeve. To provide for removal of this static powder, the previously mentioned thin sheet metal lip 11 secured to the conveyor flight along the outer peripheral edge thereof extending axially downstream, is provided. The lip efficiently shears the powder from the interior surface of the sleeve to ensure that all the powder is fed down through the sleeve at a uniform rate.

In addition, the lip insures that the interior of the sleeve is blanked off from vacuum for a relatively substantial area adjacent the shearing edge of the lip so that the powder is only loosely attached at the time of shearing. This prevents the effect of suction extending about the edge of the screw flight alone which might otherwise tend to hold some particles in position even during scraping.

To render the sleeve 4 foraminous, a plurality of radial perforations 26 spaced regularly along and about the sleeve are provided. For reasons of ease of manufacture the perforations 26 are usually likely to be greater than the average particle size of the powders transported. In order, therefore, to prevent particles from being sucked through into the chamber 6, a mesh screen 27 having smaller mesh openings than the size of the particles in the transported material, is disposed in contiguous overlapping relation to the exterior surface of the sleeve extending between the lower plate 14 and the top flange 21. The mesh screen 27 prevents the passage of particles through the perforations 26 into the chamber 6 in order to prevent the chamber from becoming filled up with powder.

Figure 4:
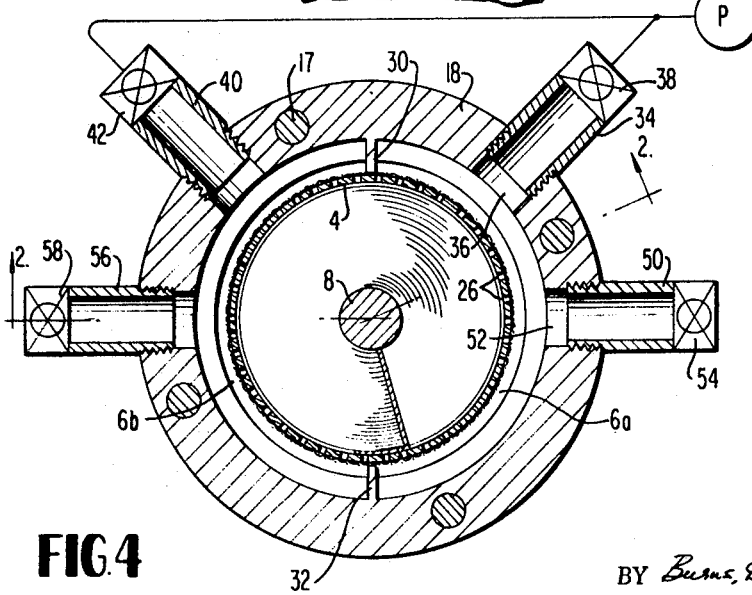
FIG. 4 is a cross-sectional top view of the portion of the apparatus shown in FIG. 2 taken along the lines 4-4 therein.

Referring to FIG. 4, the previously mentioned annular chamber 6 together with the chamber 20 in the top member 18 is divided by two diametrically opposed partitions 30 and 32 into two noncommunicating, axially extending subchambers 6a and 6b extending about opposite peripheral halves of the exterior of the sleeve. The partitions 30 and 32 are fixedly secured to the housing 2 and the sleeve 4, extending axially between the sleeve and housing.

Suitable sealing materials are applied at the junction between the inner ends of the partitions 30 and 32 and adjacent portions of the mesh screen 27 overlying the exterior of the sleeve to prevent leakage of air between the partitions and the exterior of the sleeve.

To provide for the application of suction to the interior of the subchamber 6a, a conduit 34, threadedly engaged with a radially extending opening 36 in the top member 18, is provided. The conduit 34 at one end communicates through the opening 36 with the interior of the subchamber 6a and at its remote end communicates with a suitable source of suction such as a vacuum pump P through a selectively controlled first suction valve 38 interposed in the conduit 34. When the valve 38 is selected to be open, vacuum is applied to the interior of the chamber 6a to suck air outwardly through the sleeve, thus compacting adjacent particulate material fed through the sleeve by the screw conveyor.

A similar conduit 40 and second suction valve 42 for applying suction to the subchamber 6b are also provided.

After a certain period of feeding, some of the perforations 26 are likely to have become clogged with particles of the material being fed. It is necessary to remove this material in order that vacuum may still be applied evenly to the interior of the sleeve.

For this purpose another conduit 50 threadedly engaged with a corresponding opening 52 extending radially through the top member 18, is provided. The conduit 50 communicates at its inner end with the subchamber 6a through the opening 52 and its remote end communicates with atmosphere through a selectively openable first gas valve 54 interposed in the conduit 50.

A similar conduit 56 and second gas valve 58 are provided for placing the subchamber 6b in fluid communication with atmosphere.

The valves 38, 42, 54 and 58 enable the pressure conditions within the housing 2 to be regulated in the following manner. For a majority of the time the gas valves 54 and 58 are closed, with the suction valves 38 and 42 concurrently open to apply suction pressure to the subchambers 6a and 6b so that suction is applied about the entire peripheral area of the sleeve to remove air from the particulate material being fed.

At a predetermined time, the first gas valve 54 is opened and the first suction valve 38 closed, so that atmospheric pressure is admitted to the subchamber 6a. At the same time, suction is still being applied to the subchamber 6b communicating with the interior of the sleeve with the result that the internal sleeve pressure is reduced below atmospheric pressure. Thus, the atmospheric air admitted through the valve 54 constitutes a source of gas at relatively higher pressure than the internal sleeve pressure. This pressure differential (with the exterior of the sleeve at atmospheric pressure and the interior still communicating with a vacuum source) causes any accumulated particulate materials in the perforations 26 to be back-flushed out of the perforations into the interior of the sleeve to unclog them. After an adequate period of time to allow for unclogging to be completed the first gas valve 54 is closed and the first suction valve 38 reopened to once again apply suction to the subchamber 6a.

At another predetermined time, the second suction valve 42 is closed and the second gas valve 58 opened, to place the subchamber 6b in fluid communication with atmosphere at a time when the subchamber 6a still has vacuum applied thereto. At this time, the perforations 26 in that portion of the sleeve communicating with the subchamber 6b, will be back-flushed in a manner similar to that just described.

This process may be repeated on a regular basis to keep the sleeve 4 operating in a substantially unclogged condition during continued feeding of the particulate material, utilizing suitable timing mechanism.

Figure 5:
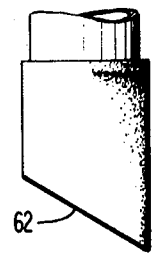
FIG. 5 is a side view of a lower end check valve forming a part of its apparatus shown in FIG. 1.

To prevent air from being drawn in from atmosphere through the bottom end of the sleeve 4 which would diminish the effect of the vacuum being applied to the material in the sleeve, a flexible lower end check valve 60 (FIGS. 1 and 5) is secured to the lower end of the housing 2. The valve 60 comprises a flexible sleeve with the sleeve walls of the valve 60 converging inwardly and downwardly into flat abutting relation in one vertical plane passing diametrically of the sleeve. The lower edge of the sleeve is provided with a diagonally, downwardly extending lower edge 62.

The sleeve walls of the valve 60 are distended apart to permit downward and outward passage of the particulate material but are urged together by atmospheric pressure to prevent passage of air into the lower end of the sleeve.

Although the invention has been described with reference to utilizing atmospheric pressure for back-flushing purposes, it will be appreciated that alternatively the conduits 50 and 56 could be connected to positive pressure sources, such as gas pumps or cylinders of stored gas, operating at pressures substantially in excess of atmospheric pressure. Also each suction valve may be adapted for venting to atmosphere concurrently with the adjacent gas pressure valve.

In a combination of back-flushing actions, atmospheric pressure may initially be utilized for a predetermined time to provide a first stage of back-flushing in which clogged material is pulled from the perforations by the suction still applied to the other subchamber. Then the back-flushing pressure may be increased by a gas pump in a second stage of back-flushing to, in effect, push any residual clogged material from the perforations.

As another alternative possibility, it would be possible to dispense entirely with the partitions dividing the annular space into two subchambers, and utilize a single chamber extending entirely about the sleeve with periodic applications of positive pressure thereto to back-flush the accumulated particulate material present in the perforations.

SUMMARY OF ADVANTAGES

It will be appreciated that in following the method and apparatus of the present invention for feeding and compacting finely divided particulate material, certain significant advantages are provided.

In particular, the invention provides a method and apparatus for feeding and compacting finely divided particulate material utilizing a foraminous screen, which provides for continued operation without loss of efficiency due to clogging of the screen.

Another significant advantage is provided by the downwardly extending lip provided about the edge of the conveyor flight which shears off any material held by vacuum against the interior of the sleeve, to provide improved feeding characteristics.

Other advantages are provided by the provision of the noncommunicating subchambers and the system of valves connecting the various suction and air pressure conduits, functioning in such a manner as to cause the suction applied to one of the subchambers to assist the action of atmospheric pressure applied to the other of the subchambers to provide a back-flushing pressure differential across the sleeve.

Furthermore, the manner in which the sleeve is simply mounted concentrically in an annular outlet housing obviates the disadvantages of certain earlier structures, exemplified by U.S. Pat. No. 3,269,611 (Komarek) which required the basic hopper structure to be modified by the provision of complicated recessed portions in the main hopper wall itself.

Although the invention has been described with reference to one preferred embodiment, it will be appreciated that numerous additions, modifications, substitutions, deletions, and other changes not specifically disclosed may be made which will fall within the purview of the appended claims.

I claim:

1. A method of continuously feeding and compacting finely divided particulate material utilizing a rotating screw feeder for advancing the material through a sleeve passage provided by a stationary foraminous sleeve mounted closely about the screw feeder, the method comprising the steps of:

mechanically advancing the particulate material along the sleeve passage with the interstitial air between particles of the material in the sleeve being at an internal sleeve pressure, applying, from a suction pressure system, a suction pressure relatively lower than the internal sleeve pressure along the exterior of the sleeve to withdraw at least a portion of the interstitial air from between the particles of the material through the sleeve to effect compaction of the material, providing noncommunicating closed hollow chambers axially extending the length of the sleeve about different peripherally spaced areas of the sleeve;

applying, while continuing to mechanically advance the material, a gas pressure relatively higher than the internal sleeve pressure along the lateral surface of each of the chambers in turn at predetermined times during which the other of the chambers has suction pressure applied thereto to cause a pressure differential across the perforations to back-flush particulate material from the perforations in the sleeve to prevent clogging thereof; and simultaneously preventing gas pressure from entering the end of the sleeve passage and the suction pressure system.

2. A method of feeding and compacting finely divided particulate material as defined in claim 1 and further comprising the steps of:

utilizing an axially advancing screw blade having an axially extending lip flush with the interior surface of the sleeve scraping the adhered material from the interior surface all along the sleeve, simultaneously spirally blanking off portions of the interior of the sleeve from the vacuum in the area embraced by the axially extending blade lip to diminish the suction forces causing the particulate material to adhere to the interior of the sleeve during scraping thereof, and opening the interior of the sleeve to vacuum in the area following the area embraced by the advancing blade.

3. An apparatus for feeding and compacting finely divided particulate material having interstitial air between the particles, the apparatus comprising:

a housing, a tubular sleeve fixedly mounted in said housing, said sleeve and adjacent interior portions of said housing defining, at least one closed hollow chamber extending about said sleeve;

said sleeve further including, a plurality of perforations placing said chamber in fluid communication with the interior of said sleeve;

an axially extending screw feeder concentrically and rotatably mounted in said sleeve, said feeder upon rotation thereof adapted to feed the particulate material axially along said sleeve with the interstitial air being at an internal sleeve pressure;

partition means within said chamber extending between and fixedly secured to said housing and sleeve, said partition means dividing said chamber into at least two axially extending, noncommunicating subchambers extending peripherally about different portions of said s sleeve;

suction means connected with said housing for selectively applying suction pressure relatively lower than the internal sleeve pressure through said perforations to the interior of said sleeve to withdraw along the lateral surface of the sleeve at least a portion of the interstitial air from the particulate material to effect compaction thereof during feeding including first suction means communicating only with one of said subchambers and, second suction means communicating only with the other of said subchambers;

gas pressure means connected with said housing for supplying gas at a relatively higher pressure than the internal sleeve pressure to said perforations along the lateral surface of said sleeve at predetermined times to back-flush particulate material from said perforations to prevent clogging thereof, including first gas pressure means communicating only with said one of said subchambers; and second gas pressure means communicating only with said other of said subchambers.

4. An apparatus as defined in claim 3 wherein said screw feeder includes, an axially extending shaft concentrically positioned within and spaced from said sleeve, an axially extending screw flight secured to said shaft extending generally helically therealong, said flight including, a peripheral edge closely adjacent interior portions of said sleeve, a lip fixedly secured to said screw flight extending continuously along said peripheral edge, said lip extending axially downstream from said edge and said lip being in contact with adjacent interior portions of said sleeve.

5. An apparatus as defined in claim 3 further including, a tubular sleeve check valve connected with said sleeve adjacent an outlet end of said passage for restrictively permitting outward passage of particulate material through the sleeve to maintain a back pressure on the material and preventing ingress of air into said outlet passage.

6. An apparatus as defined in claim 3 further including, first and second suction valves connected with said first and second means respectively, each of said suction valves upon opening thereof placing the associated one of said first and second suction means in fluid communication with the associated one of said subchambers; and first and second gas valves connected with said first and second gas pressure means respectively, each of said gas valves upon opening thereof placing the associated one of said first and second gas pressure means in fluid communication with the associated one of said subchambers, said first gas valve being opened concurrently with closing of said first suction valve at predetermined times during which said second gas valve is closed and said second suction valve is open, said second gas valve being opened concurrently with closing of said second suction valve at other predetermined times during which said first gas valve is closed and said first suction valve is open.

7. An apparatus as defined in claim 3 further including, a layer of perforate mesh of smaller mesh size than the size of the particles, said layer of mesh contiguously overlying said sleeve on a surface hereof facing inwardly of said chamber.